US008260350B2

(12) United States Patent
Jaiswal et al.

(10) Patent No.: US 8,260,350 B2
(45) Date of Patent: Sep. 4, 2012

(54) EMBEDDED BIOMETRICS IN TELECOMMUNICATION DEVICES FOR FEATURE EXTRACTION AND CONTEXT IDENTIFICATION

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/258,101

(22) Filed: Oct. 24, 2008

(65) Prior Publication Data

US 2010/0105426 A1    Apr. 29, 2010

(51) Int. Cl.
 *H04M 1/00* (2006.01)
(52) U.S. Cl. ............... 455/556.1; 455/411; 455/517; 455/518; 455/520; 713/186; 379/168; 379/142.01
(58) Field of Classification Search ............... 455/556.1, 455/411, 517, 418, 520; 370/142.05, 142.06; 340/5.8–5.84, 5.51–5.63, 5.1, 5.2, 5.52, 5.53, 340/5.6, 5.65, 573.1
See application file for complete search history.

(56) References Cited

U.S. PATENT DOCUMENTS

| | | | |
|---|---|---|---|
| 6,556,127 B1 * | 4/2003 | Moser et al. ................. | 340/5.84 |
| 6,697,457 B2 * | 2/2004 | Petrushin ................... | 379/88.08 |
| 7,318,032 B1 | 1/2008 | Chaudhari et al. | |
| 2001/0027520 A1 * | 10/2001 | Mori ............................. | 713/186 |
| 2004/0013252 A1 * | 1/2004 | Craner ..................... | 379/142.01 |
| 2007/0071206 A1 * | 3/2007 | Gainsboro et al. ............ | 379/168 |
| 2008/0059158 A1 * | 3/2008 | Matsuo et al. ................ | 704/221 |
| 2008/0144790 A1 * | 6/2008 | Ollis et al. ............... | 379/142.01 |
| 2009/0002178 A1 * | 1/2009 | Guday et al. ............... | 340/573.1 |
| 2010/0121644 A1 * | 5/2010 | Glasser ........................ | 704/273 |

* cited by examiner

*Primary Examiner* — Nick Corsaro
*Assistant Examiner* — Chuong A Ngo
(74) *Attorney, Agent, or Firm* — Yudell Isidore Ng Russell PLLC

(57) ABSTRACT

A method, a system and a computer program product for determining one or more characteristics of a caller, such as the mood, gender, age, and urgency of the caller, utilizing the biometric characteristics of the caller. One or more biometric characteristics are detected when a request to place an outgoing call to one or more destinations is received at a first telecommunication device. When the request to place an outgoing call is a verbal request, one or more biometric voice samples are obtained. The biometric voice samples comprise the biometric characteristics of the caller. The biometric characteristics are extracted from the biometric voice samples, encoded into a datagram, and transmitted from the first telecommunication device to the outgoing call destination (i.e. a second telecommunication device). When the biometric characteristics are analyzed at the second telecommunication device, a display is generated depicting the mood, gender, age, urgency or other characteristics of the caller associated with the incoming call.

18 Claims, 5 Drawing Sheets

EMBEDDED BIOMETRICS IN TELECOMMUNICATION DEVICES FOR FEATURE EXTRACTION AND CONTEXT IDENTIFICATION

BACKGROUND

1. Technical Field

The present invention generally relates to computer-implemented telephonic systems and in particular to biometric applications in telephonic computer systems.

2. Description of the Related Art

Biometric verification provides a secure method of identification, and is reliable and often user-friendly. Generally, biometrics refers to the unique attributes of an individual, such as voice print, eyes, and fingerprints. The use of biometrics in cellular phone devices is a progressively growing technology. Major cellular phone manufacturers (e.g. LG, Samsung, Hitachi) utilize biometrics to provide increased security for cellular phone devices; for example, the use of fingerprints to lock and/or unlock cellular phones.

Humans perform biometric analysis using inherent senses such as sight and sound to discriminate between people based on physical attributes, as wells as to discern the current disposition of an individual. Devices, such as cellular phones, facilitate biometric verification via voice print matching and fingerprint scans to verify an individual's identity. However, the use of biometric analysis for cellular phones has been limited to merely differentiating between one or more individuals.

SUMMARY OF ILLUSTRATIVE EMBODIMENTS

Disclosed are a method, a system and a computer program product for determining one or more characteristics of a caller, such as the mood, gender, age, and urgency of the caller, utilizing the biometric characteristics of the caller. One or more biometric characteristics are detected when a request to place an outgoing call to one or more destinations is received at a first telecommunication device. When the request to place an outgoing call is a verbal request, one or more biometric voice samples are obtained. The biometric voice samples comprise the biometric characteristics of the caller. The biometric characteristics are extracted from the biometric voice samples, encoded into a datagram, and transmitted from the first telecommunication device to the outgoing call destination (i.e. a second telecommunication device). When the biometric characteristics are analyzed at the second telecommunication device, a display is generated depicting the mood, gender, age, urgency or other characteristics of the caller associated with the incoming call.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
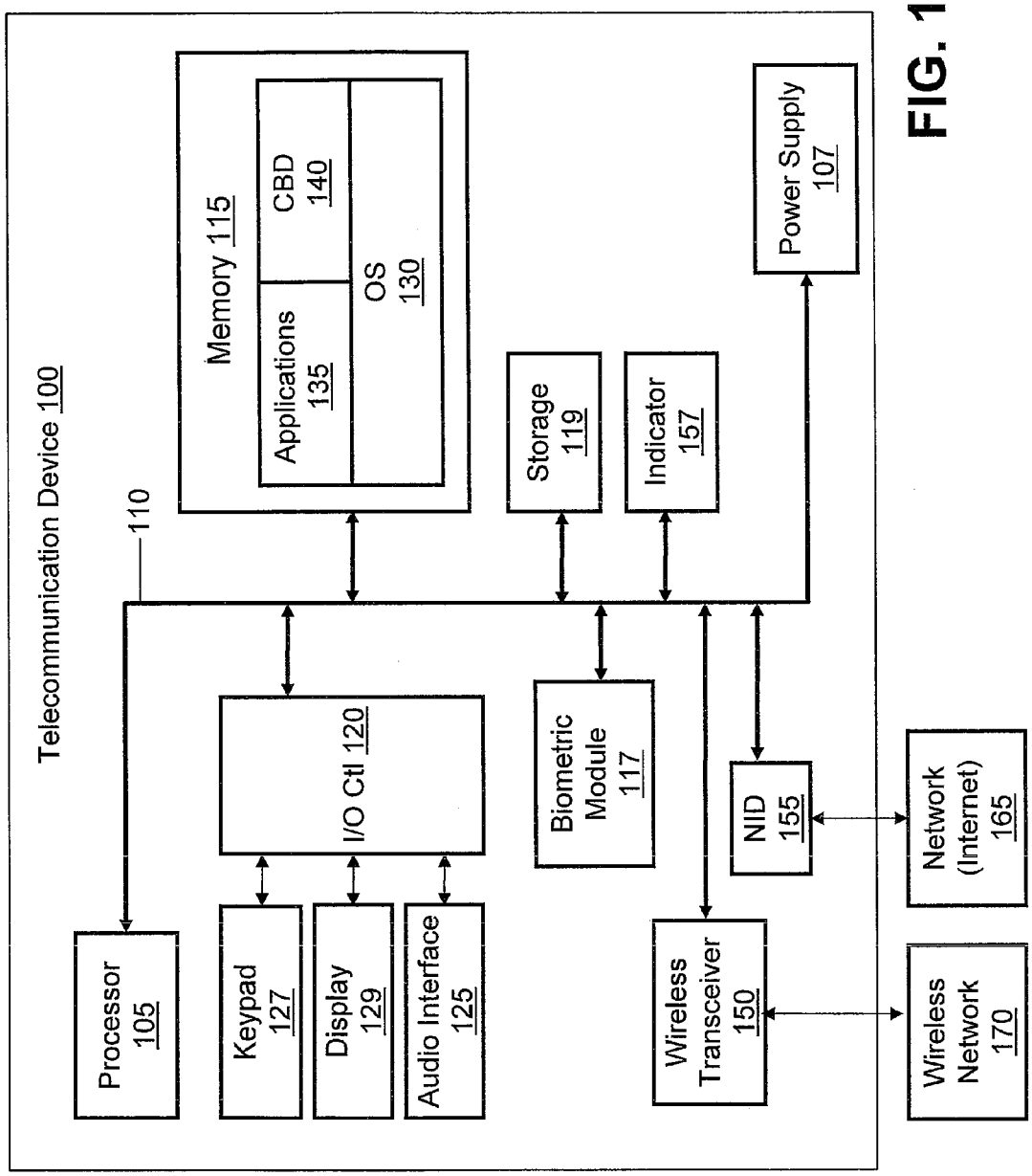
FIG. 1 provides a block diagram representation of an example telecommunication device within which the invention is practiced, according to one embodiment of the invention.

The illustrative embodiments provide a method, a system and a computer program product for determining one or more characteristics of a caller, such as the mood, gender, age, and urgency of the caller, utilizing the biometric characteristics of the caller. One or more biometric characteristics are detected when a request to place an outgoing call to one or more destinations is received at a first telecommunication device. When the request to place an outgoing call is a verbal request, one or more biometric voice samples are obtained. The biometric voice samples comprise the biometric characteristics of the caller. The biometric characteristics are extracted from the biometric voice samples, encoded into a datagram, and transmitted from the first telecommunication device to the outgoing call destination (i.e. a second telecommunication device). When the biometric characteristics are analyzed at the second telecommunication device, a display is generated depicting the mood, gender, age, urgency or other characteristics of the caller associated with the incoming call.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of a telecommunication device (TCD). TCD 100 comprises at least one processor 105 connected to system memory 115 via system interconnect 110. Processor 105 may include a digital signal processor (DSP) for voice signal processing. Also connected to system interconnect 110 is I/O controller 120, which provides connectivity and control for (a) input devices, of which keypad 127 is illustrated, (b) output devices, of which display 129 is illustrated, and (c) audio interface 125, which provides a microphone input and speaker output. Keypad 127 may be a push button numeric dialing pad and/or a fully functional keyboard, including a selecting device (e.g. pointer, mouse, and/or scrolling device) that enables interaction with a graphical user interface. Display 129 may be touch-sensitive, also acting as an input device. TCD 100 also comprises storage 119, within which data/instructions/code may be stored. TCD 100 is also illustrated with wireless transceiver 150, with which TCD 100 may accesses external wireless network 170, such as a wireless/cellular network. TCD 100 may include biometric module 117, wherein components utilized for biometric detection and analysis reside.

TCD 100 is also illustrated with network interface device (NID) 155, with which TCD 100 connects to network (Internet) 165. In the described embodiments, network 165 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

TCD 100 also comprises power supply 107, which may be implemented as one or more batteries. Power supply 107 may also further include an external power source, such as an AC adapter or a powered docking cradle that supplements or recharges the batteries.

Notably, in addition to the above described hardware components of TCD 100, various features of the invention are completed via software (or firmware) code or logic stored within memory 115 or other storage (e.g., storage 119) and executed by processor 105. Thus, illustrated within memory 115 are a number of software/firmware components, including operating system (OS) 130, applications 135, and caller biometric detector (CBD) utility 140. Components of biometric module 117 are controlled by CBD utility 140. The biometric detection component of TCD 100, controlled by CBD utility 140, allows a detection of one or more characteristics of a caller, such as a mood, gender, age, and urgency of the caller when a call is received. The one or more biometric characteristics are utilized to determine the mood, gender, age, and urgency of the caller. For simplicity, CBD utility 140 is illustrated and described as a stand alone or separate software/firmware component, which manages biometric module 117 and provides specific functions, as described below.

Processor 105 executes CBD utility 140 as well as OS 130, which supports the user interface features of CBD utility 140. In the illustrative embodiment, CBD utility 140 provides one or more graphical user interfaces (GUI) to enable user interaction with, or manipulation of, the functional features of the utility (140). Among the software code/instructions provided by CBD utility 140, and which are specific to the invention, are: (a) code for detecting one or more biometric characteristics when a request to place an outgoing call to one or more destinations is received at a first telecommunication device; (b) code for encoding one or more biometric characteristics into a datagram; (c) code for transmitting the encoded datagram to the one or more outgoing call destinations, wherein the one or more outgoing call destinations are determined when one or more of a verbalized phone number, a verbalized name, a typed-in phone number, and/or typed-in name are received; (d) code for deciphering a received biometric datagram; and (e) code for displaying the biometric characteristics on the receiving device. For simplicity of the description, the collective body of code that enables these various features is referred to herein as CBD utility 140. According to the illustrative embodiment, when processor 105 executes CBD utility 140, TCD 100 initiates a series of functional processes that enable the above functional features as well as additional features/functionality, which are described below within the description of FIGS. 2-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The telecommunication device depicted in FIG. 1 may be, for example, a Blackberry™, Palm Treo™, iPhone™, and other devices capable of providing/executing outgoing and incoming calls. However, the device in which the application is utilized may not necessarily be a mobile device. The device may be a computer with communication capability. The functionality described herein may also be extended to other non-mobile communication devices, such as public switch telephone network (PSTN) phones (analog/digital) and voice over Internet protocol (VOIP) phones and the like.

Figure 2:
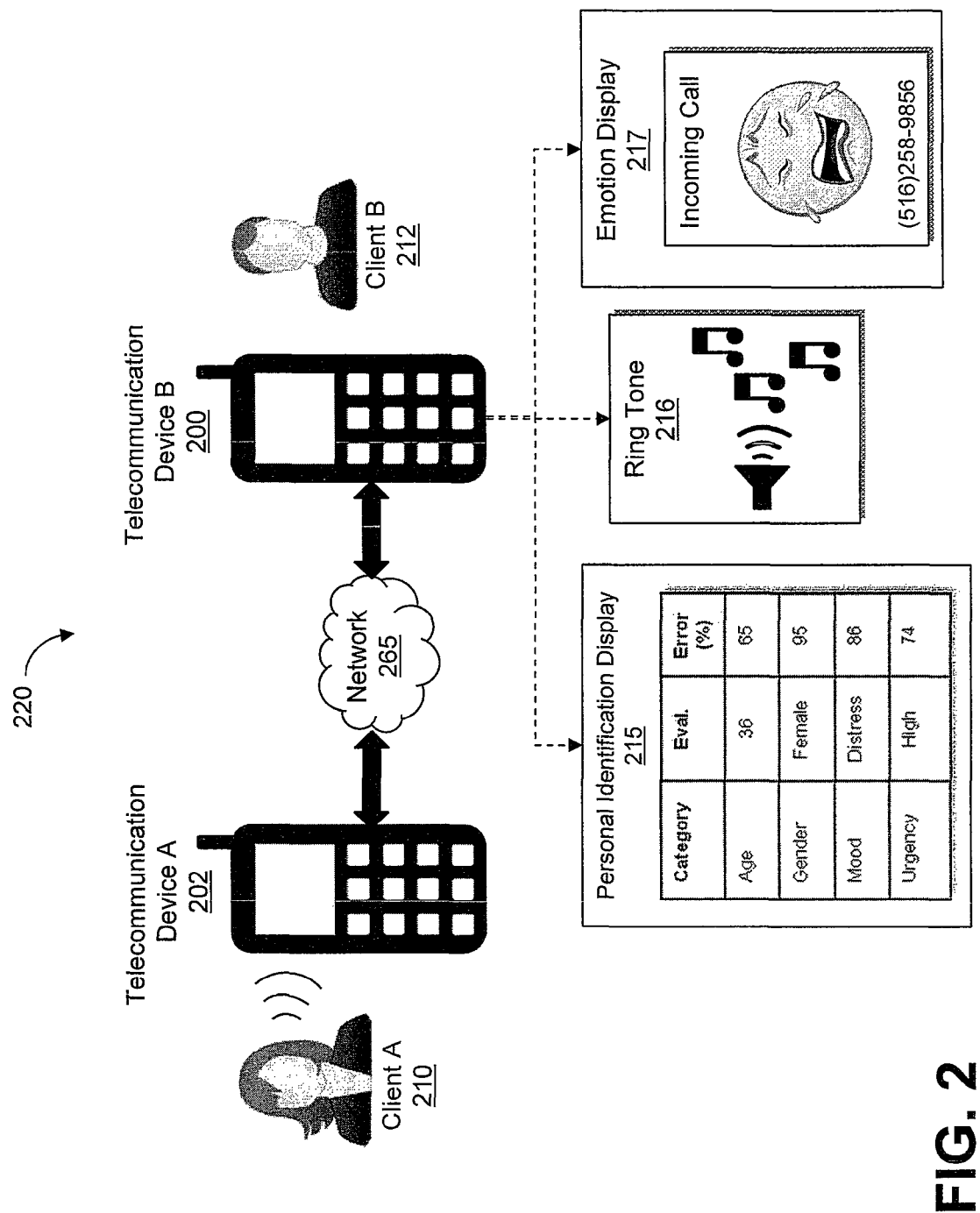
FIG. 2 illustrates an example telecommunication device call network, in accordance with one embodiment of the invention.

With reference now to FIG. 2, there is depicted an information exchange between two telecommunication devices. TCD call network 220 of FIG. 2 comprises client A 210 communicating on TCD A 202. Network 265 (similar to network 165 of FIG. 1) transmits communication between TCD A 202 and TCD B 200. Client B 212 communicates on TCD B 200. TCD B 200 is configured to generate one or more of: personal identification display 215, ring tone 216, and emotion display 217.

In one embodiment, voice dialing is enabled on a first telecommunication device. First telecommunication device, TCD A 202, includes a biometric module, when the biometric module is detected by TCD A 202, voice dialing is enabled. TCD A 202 receives one or more of a verbalized phone number, a verbalized name, typed-in phone number, and/or typed-in name from client A 210, wherein the verbalized phone number and the verbalized name are associated with one or more outgoing call destinations. TCD A 202 may connect to a second telecommunication device, via network 265 when the verbalized phone number and/or verbalized names are received.

In one embodiment, one or more biometric characteristics are detected when a request to place an outgoing call to one or more destinations is received at a first telecommunication device. When the verbalized phone number and/or verbalized names are detected at TCD A 202, one or more biometric voice samples are received by the biometric module within TCD A 202 (as controlled by CBD utility 140). One or more biometric characteristics are then extracted from the biometric voice samples. The biometric characteristics are encoded into a datagram, to create an encoded datagram. When the number of bits of the encoded datagram exceeds a predefined transmission bandwidth for network 265, data compression is enabled for the encoded datagram, and the biometric information within the encoded datagram is further encoded utilizing fewer bits. The encoded datagram (compressed or uncompressed) is transmitted to a second telecommunication device via a transport mechanism such as signaling system #7 (SS7), a set of telephony signaling protocols.

In another embodiment, an incoming call is detected at a second telecommunication device. For example, second telecommunication device, TCD B 200, receives the incoming call from TCD A 202, via network 265. The incoming call includes one or more encoded datagrams. Similar to TCD 100 (FIG. 1), TCD 200 includes a biometric module, which receives the one or more encoded datagrams. An encoded datagram is decompressed, if necessary, and decoded by the biometric module (as controlled by CBD utility 140), to extract the one or more biometric characteristics for analysis.

In one embodiment, the one or more biometric characteristics of an incoming call to a second telecommunication device are analyzed. The biometric characteristics comprises, without limitation one or more of: voice pitch, voice intensity, voice volume, velocity of words, a time between words, and a breathing intensity. The analysis of the biometric characteristics of client A 210 may provide information to client B 212, regarding the current disposition of client A 210.

In one embodiment, one or more of a text display, a graphical user interface, an icon, and a ringtone are generated at a second telecommunication device. At the second telecommunication device, the text display, graphical user interface, icon, and ringtone identifies one or more of the mood, gender, age, and urgency of the caller associated with the incoming call. Personal identification display 215 may be a text display and/or graphical user interface that provide information about client A 210. The information provided in personal identification display 215 may include the categories of age, gender, mood, and urgency of the call. An evaluation of each category may also be provided within personal identification display 215, thereby outputting the age, gender, mood, and urgency of the caller, as analyzed. An error analysis may be included with the category and evaluation information. The error analysis considers the attenuation and call degradation associated with the collected biometric voice samples. Ringtone 216 may also be generated by TCD B 200. Ringtone 216 provides a ringtone and/or vibration to reflect the emotion and/or mood of the incoming call as evaluated from the biometric characteristic. Emotion display 217 is generated by TCD 200 when the incoming call is received, and reflects the mood of the caller, as evaluated from the biometric characteristics.

Figure 3:
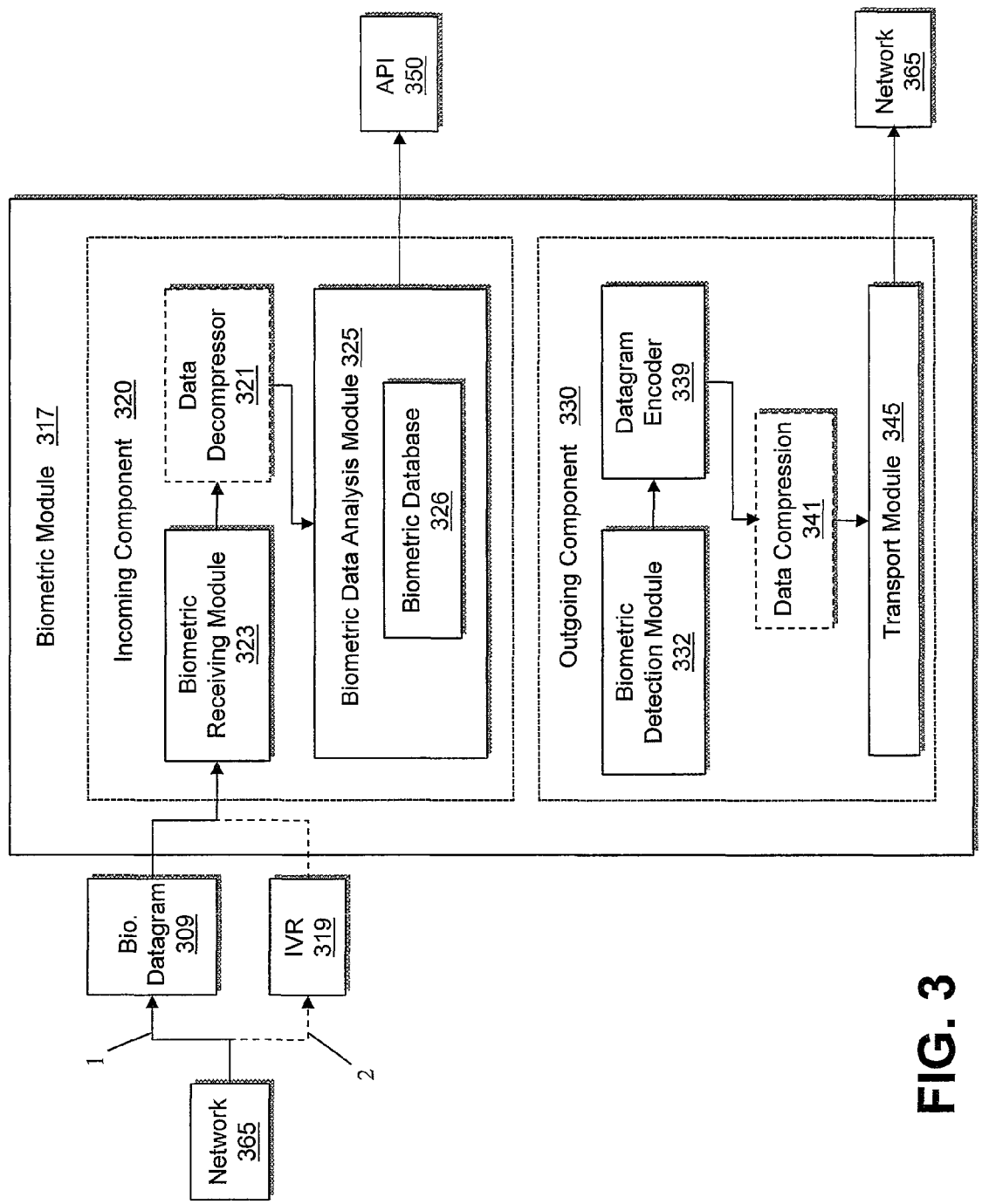
FIG. 3 is a block diagram illustrating operations of a biometric module, according to one embodiment of the invention.

FIG. 3 illustrates operations of a biometric call detection module. Calls are received and/or transmitted from a telecommunication device that includes a biometric module (such as biometric module 117 of FIG. 1). Biometric module 317 comprises incoming component 320 and outgoing component 330. Within incoming component 320 are biometric receiving module 323, data decompressor 321, and biometric data analysis module 325. Biometric database 326 resides within biometric data analysis module 325. Biometric datagram 309 is transmitted to incoming component 320 (as depicted by marker '1'). Network 365 may also connect the incoming call to interactive voice response (IVR) 319 (as depicted by marker '2'). Application programming interface (API) 350 may receive biometric information from biometric data analysis module 325. Outgoing component 330 includes biometric detection module 332, datagram encoder 339, data compression 341, and transport module 345.

In one embodiment, an encoded datagram is transmitted from a first telecommunication device to a second telecommunication device. Biometric receiving module 323 determines that an encoded datagram is received, when the an incoming call is received. The first telecommunication device includes a biometric module, such as biometric module 317, an encoded datagram is transmitted via network 365. An encoded datagram, or biometric datagram 309, is received by biometric receiving module 323, within biometric module 317. Biometric receiving module 323 transmits biometric datagram 309 to data decompressor 321, when biometric datagram 309 is compressed. Data decompressor 321 decodes, or decompresses, the compressed encoded datagram. After biometric datagram 309 is decompressed, biometric datagram 309 is transmitted to biometric data analysis module 325. Biometric datagram 309 bypasses decompressor 321, when biometric datagram 309 is not compressed. Biometric datagram 309 is then transmitted directly to biometric data analysis module 325.

In another embodiment, the encoded datagram is not received at the second telecommunication device. When an encoded datagram is not received at the second telecommunication device, an automated interactive voice response (IVR 319) is automatically invoked to receive the call at the second telecommunication device. Interactive voice response IVR 319 enables one or more biometric voice samples to be detected when a caller verbally responds to automated questions generated by IVR 319. One or more biometric voice samples are detected when the automated interactive voice response (IVR 319) is invoked. One or more biometric voice samples are received by biometric receiving module 323. The one or more biometric characteristics, of the incoming caller, are extracted from the one or more biometric voice samples and transmitted to biometric data analysis module 325.

In one embodiment, a database of one or more biometric characteristics is generated, wherein the biometric characteristics are assigned to one or more of the mood, the gender, the age, and the urgency of the caller. A database, such as biometric database 326, includes data wherein one or more biometric characteristics are assigned to: one or more voices depicting one or more moods/emotions, one or more voices of one or more genders, one or more voices of one or more ages, and one or more voices depicting one or more levels of call urgency. CBD utility 140 enables analysis of the one or more biometric characteristics. Biometric database 326 is dynamically searched to determine one or more of the mood, the gender, the age, and the urgency of the caller associated with one or more biometric characteristics of the incoming call. The one or more biometric characteristics are retrieved from the one or more biometric voice samples received with the incoming call.

In another embodiment, a result of the biometric characteristics analysis is generated. API 350 receives one or more results from the analysis transmitted via biometric data analysis module 325. The one or more results depict one or more of: the mood, the gender, the age, and the urgency of the caller. When the results are received by API 350, one or more of a text display, a graphical user interface, an icon, and a ringtone are generated. The text display, graphical user interface, icon, and ringtone identify one or more of the mood, gender, age, and urgency of the caller associated with the incoming call at the second telecommunication device.

In one embodiment, an error analysis of the analyzed results is generated. When the results are generated, biometric data analysis module 325 also generates an error analysis of the analyzed results. The error analysis depicts a measure of confidence in the result of the analysis. The error analysis is associated with one or more of the mood, the gender, the age, and the urgency of the caller. When a display of one or more of the mood, the gender, the age, and the urgency of the caller is generated, a display and/or output of the error analysis are also provided.

In another embodiment, a first telecommunication device, with a biometric module, receives a call request. Biometric detection module 332 detects one or more biometric characteristics when a request to place an outgoing call to one or more destinations is received. When the verbalized phone number and/or verbalized name are received, one or more biometric voice samples are dynamically extracted from the verbalized phone number and/or verbalized name. The biometric voice sample is then associated with the mood, the gender, the age, and the urgency of the caller.

In one embodiment, at a first telecommunication device, a biometric detection module detects an outgoing call request. Biometric voice samples are collected and biometric characteristics of the caller are extracted. One or more biometric characteristics are encoded, via datagram encoder 339, to generate an encoded datagram. When a number of bits of the encoded datagram exceed a predefined transmission bandwidth, the encoded datagram is transmitted to data compression 341. The encoded datagram is associated with the outgoing call at the first telecommunication device. Transport module 345 transmits the encoded and compressed (if necessary) datagram to one or more call destinations via network 365. The one or more outgoing call destinations are determined when one or more of the verbalized phone number and a verbalized name are received.

Figure 4:
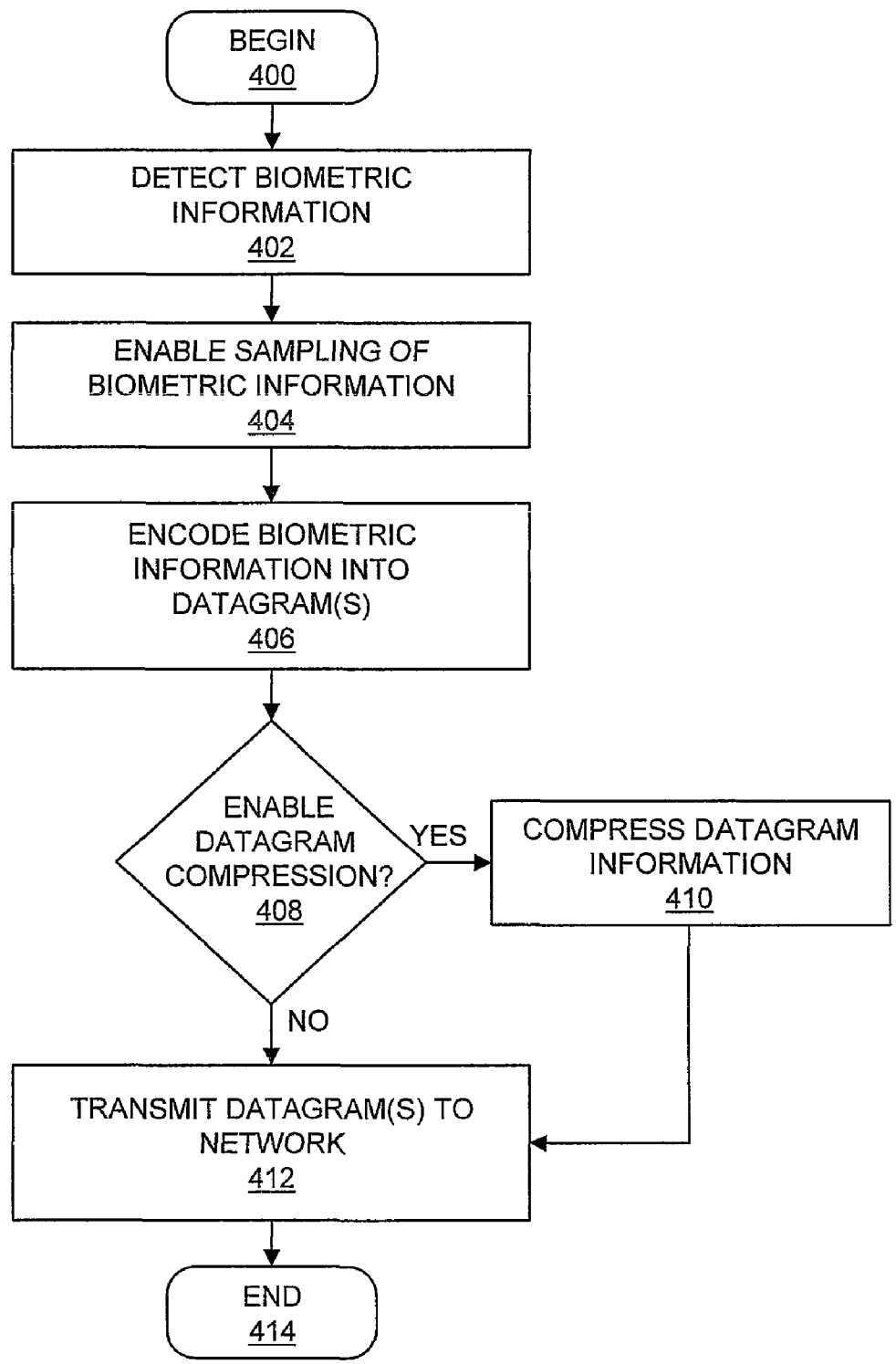
FIG. 4 is a flow chart illustrating the method by which biometric information is delivered to a telecommunication device during an outgoing call, in accordance with one embodiment of the invention.
Figure 5:
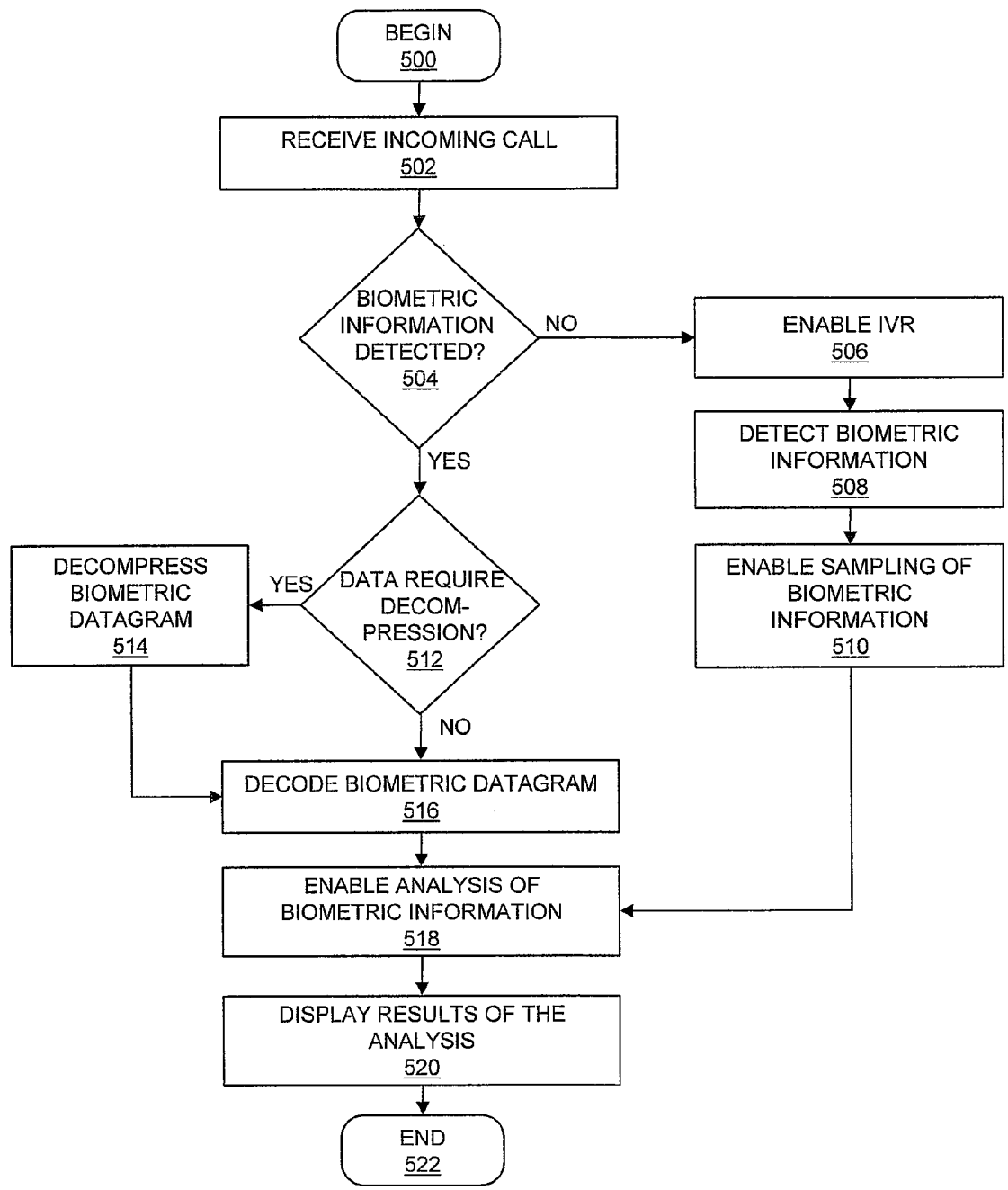
FIG. 5 is a flow chart illustrating the method by which biometric information is detected by a telecommunication device during an incoming call, according to one embodiment of the invention.

FIGS. 4-5 are flow charts illustrating various methods by which the above processes of the illustrative embodiments are completed. Although the methods illustrated in FIGS. 4-5 may be described with reference to components shown in FIGS. 1-3, it should be understood that this is merely for convenience and alternative components and/or configurations thereof can be employed when implementing the various methods. Key portions of the methods may be completed by CBD utility 140 executing on processor 105 within TCD 100 (FIG. 1) and controlling specific operations on TCD 100, and the methods are thus described from the perspective of both CBD utility 140 and TCD 100.

FIG. 4 is a logic flow chart illustrating the method by which biometric information is delivered to a telecommunication device during an outgoing call. The process of FIG. 4 begins at initiator block 400 and proceeds to block 402, at which biometric information is detected, when the call is received. At block 404 sampling of the detected biometric information is enabled. Biometric information is encoded into one or more datagrams, at block 406. At block 408 a decision is made whether to enable compression of the datagram information. If compression of the datagram information is enabled, the process continues to block 410. At block 410 the datagram information is compressed. The process continues to block 412. If the compression of the data is not enabled, at block 408, the process continues to block 412. At block 412 the one or more datagrams are transmitted, via the network to the final destination, which is defined during the outgoing call request. The process ends at block 414.

The method by which biometric information is received during an incoming call is illustrated in FIG. 5. The process of FIG. 5 begins at initiator block 500 and proceeds to block 402, at which an incoming call is received. The utility checks incoming data for biometric information, at block 504 a decision is made whether biometric information is detected by the utility. If biometric information is not detected, the process continues to block 506. An automated interactive voice response (IVR) is enabled at block 506. At block 508, biometric information is detected. Sampling of the biometric information is enabled and one or more biometric characteristics are extracted for analysis at block 510. The process continues to block 518.

If biometric information is detected at block 504, the process continues to block 512. At block 512, a decision is made whether decompression of the biometric data is required. If the decompression of the biometric data is enabled, the process continues to block 514. At block 514 the biometric data is decompressed. The process continues to block 516. If decompression of the biometric datagram is not required, the process continues to block 516. The biometric datagram is decoded at block 516. At block 518 analysis of the biometric information is enabled. Results of the analysis are displayed at block 520, wherein the results depict the encoded characteristics of the caller from among one or more of: the mood, the gender, the age, and the urgency of the caller. The process ends at block 522.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for determining one or more characteristics of a caller associated with a communication device, the method comprising:
   enabling voice-dialing;
   associating a verbalized phone number and a verbalized name with one or more destinations of an outgoing call, wherein the one or more destinations are determined in response to receipt of one or more of the verbalized phone number and the verbalized name;
   in response to receiving a request to place an outgoing call to one or more destinations, a first telecommunication device detecting one or more biometric characteristics;
   receiving one or more of the verbalized phone number and the verbalized name;
   in response to receiving one or more of the verbalized phone number and the verbalized name, dynamically extracting one or more biometric voice samples from one or more of the verbalized phone number and the verbalized name, wherein the biometric voice sample is associated with a mood, a gender, an age, and an urgency of the caller;
   encoding the one or more biometric characteristics into a datagram, to generate an encoded datagram; and
   the first telecommunication device transmitting the encoded datagram to the one or more destinations specified by the outgoing call request, wherein the encoded datagram enables generation of an output of the biometric characteristics on a second telecommunication device at the one or more destinations.

2. The method of claim 1, further comprising:
   the first telecommunication device receiving an incoming call from a second telecommunication device;
   detecting one or more biometric characteristics within the incoming call;
   analyzing the one or more biometric characteristics of the incoming call, wherein the biometric characteristics comprise one or more of: a voice pitch, a voice intensity, a voice volume, a velocity of words, a time between words, and a breathing intensity; and
   generating an output that identifies the one or more received biometric characteristics of the incoming call.

3. The method of claim 2, further comprising:
   in response to receiving the incoming call, determining a mood, gender, age, and urgency of the caller that placed the incoming call, wherein the one or more biometric characteristics of the incoming call are utilized to determine the mood, the gender, the age, and the urgency of the caller.

4. The method of claim 2, further comprising:
   assigning one or more biometric characteristics to a database containing: one or more voices depicting one or more moods, one or more voices of one or more genders, one or more voices of one or more ages, and one or more voices depicting one or more levels of importance; and
   dynamically searching the database to determine one or more of the mood, the gender, the age, and the urgency of the caller associated with one or more biometric characteristics of the biometric voice samples, wherein the one or more biometric characteristics are retrieved from the one or more biometric voice samples received with the incoming call.

5. The method of claim 1, further comprising:
   in response to a number of bits of the encoded datagram exceeding a predefined transmission bandwidth, enabling data compression of the encoded datagram;
   associating the encoded datagram with the outgoing call;
   transmitting the encoded datagram to the second telecommunication device;
   determining when the encoded datagram is received by the second telecommunication device;
   in response to the second telecommunication device not receiving the encoded datagram, automatically invoking an automated interactive voice response to receive the outgoing call at the second telecommunication device, wherein the automated interactive voice response enables one or more biometric voice samples to be detected;
   detecting one or more biometric voice samples when the automated interactive voice response is invoked;
   in response to detecting the one or more biometric voice samples, receiving the one or more biometric voice samples; and
   extracting the one or more biometric characteristics from the one or more biometric voice samples.

6. The method of claim 1, further comprising:
   detecting the incoming call from the second telecommunication device, wherein the incoming call is associated with the encoded datagram;
   receiving the encoded datagram;
   in response to the encoded datagram being a compressed encoded datagram, decompressing the encoded datagram; and
   decoding the encoded datagram to extract one or more biometric characteristics.

7. The method of claim 1, further comprising:
generating a database of the one or more biometric characteristics assigned to one or more of a mood, a gender, an age, and an urgency of the caller;
analyzing the one or more biometric characteristics received from the caller;
receiving a result of the analysis, wherein the result depicts one or more of: the mood, the gender, the age, and the urgency of the caller;
generating an error analysis of the analyzed results, wherein the error analysis depicts a measure of confidence in the result of the analysis;
associating the error analysis with one or more of the mood, the gender, the age, and the urgency of the caller; and
outputting the error analysis when a display of one or more of the mood, the gender, the age, and the urgency of the caller is generated.

8. A computer program product for determining one or more characteristics of a caller, said computer program product comprising a machine readable storage medium having program code embodied therein that when executed by a processor provides the functions of:
enabling voice-dialing;
associating a verbalized phone number and a verbalized name with one or more destinations of an outgoing call, wherein the one or more destinations are determined in response to receiving one or more of the verbalized phone number and the verbalized name;
in response to receiving a request to place an outgoing call to one or more destinations, a first telecommunication device detecting one or more biometric characteristics;
receiving one or more of the verbalized phone number and the verbalized name;
in response to receiving one or more of the verbalized phone number and the verbalized name, dynamically extracting one or more biometric voice samples from one or more of the verbalized phone number and the verbalized name, wherein the biometric voice sample is associated with a mood, a gender, an age, and an urgency of the caller;
encoding the one or more biometric characteristics into a datagram, to generate an encoded datagram; and
transmitting, from the first telecommunication device, the encoded datagram to the one or more destinations specified by the outgoing call request, wherein the encoded datagram enables generation of an output of the biometric characteristics on a second telecommunication device at the one or more destinations.

9. The computer program product of claim 8, further comprising program code for:
the first telecommunication device receiving an incoming call from a second telecommunication device;
detecting one or more biometric characteristics within the incoming call;
analyzing the one or more biometric characteristics of the incoming call, wherein the biometric characteristics comprises one or more of: a voice pitch, a voice intensity, a voice volume, a velocity of words, a time between words, and a breathing intensity; and
generating an output that identifies the one or more the received biometric characteristics of the incoming call.

10. The computer program product of claim 9, further comprising program code for:
in response to receiving the incoming call, determining a mood, gender, age, and urgency of the caller that placed the incoming call, wherein the one or more biometric characteristics of the incoming call are utilized to determine the mood, the gender, the age, and the urgency of the caller.

11. The computer program product of claim 9, further comprising program code for:
assigning one or more biometric characteristics to a database containing: one or more voices depicting one or more moods, one or more voices of one or more genders, one or more voices of one or more ages, and one or more voices depicting one or more levels of importance; and
dynamically searching the database to determine one or more of the mood, the gender, the age, and the urgency of the caller associated with one or more biometric characteristics of the biometric voice samples, wherein the one or more biometric characteristics are retrieved from the one or more biometric voice samples received with the incoming call.

12. The computer program product of claim 8, further comprising program code for:
in response to a number of bits of the encoded datagram exceeding a predefined transmission bandwidth, enabling data compression of the encoded datagram;
associating the encoded datagram with the outgoing call;
transmitting the encoded datagram to the second telecommunication device;
determining when the encoded datagram is received by the second telecommunication device;
in response to the second telecommunication device not receiving the encoded datagram, automatically invoking an automated interactive voice response to receive the outgoing call at the second telecommunication device, wherein the automated interactive voice response enables one or more biometric voice samples to be detected;
detecting one or more biometric voice samples when the automated interactive voice response is invoked;
in response to detecting one or more biometric voice samples, receiving the one or more biometric voice samples; and
extracting the one or more biometric characteristics from the one or more biometric voice samples.

13. The computer program product of claim 8, further comprising program code for:
detecting the incoming call from the second telecommunication device, wherein the incoming call is associated with the encoded datagram;
receiving the encoded datagram;
in response to the encoded datagram being a compressed encoded datagram, decompressing the encoded datagram; and
decoding the encoded datagram to extract one or more biometric characteristics.

14. The computer program product of claim 8, further comprising program code for:
generating a database of the one or more biometric characteristics assigned to one or more of a mood, a gender, an age, and an urgency of the caller;
analyzing the one or more biometric characteristics received from the caller;
receiving a result of the analysis, wherein the result depicts one or more of: the mood, the gender, the age, and the urgency of the caller;
generating an error analysis of the analyzed results, wherein the error analysis depicts a measure of confidence in the result of the analysis;

associating the error analysis with one or more of the mood, the gender, the age, and the urgency of the caller; and outputting the error analysis when a display of one or more of the mood, the gender, the age, and the urgency of the caller is generated.

15. A computer system for determining one or more characteristics of a caller, said computer system comprising:

a processor component; and a utility executing on the processor component and which comprises code that:

enables voice-dialing;

associates a verbalized phone number and a verbalized name with the one or more destinations of the outgoing call, wherein the one or more destinations are determined in response to receiving one or more of the verbalized phone number and the verbalized name;

in response to receiving a request to place an outgoing call to one or more destinations, detects one or more biometric characteristics;

receives one or more of the verbalized phone number and the a verbalized name;

in response to receiving one or more of the verbalized phone number and verbalized name are received, dynamically extracts one or more biometric voice samples from one or more of the verbalized phone number and verbalized name, wherein the biometric voice sample is associated with a mood, a gender, an age, and an urgency of the caller;

encodes the one or more biometric characteristics into a datagram, to generate an encoded datagram;

transmits the encoded datagram to the one or more destinations specified by the outgoing call request, wherein the encoded datagram enables generation of an output of the biometric characteristics on a second telecommunication device at the one or more destinations;

detects one or more biometric characteristics within the incoming call;

analyzes the one or more biometric characteristics of the incoming call, wherein the biometric characteristics comprises one or more of: a voice pitch, a voice intensity, a voice volume, a velocity of words, a time between words, and a breathing intensity; and generates an output that identifies the one or more received biometric characteristics of the incoming call.

16. The computer system of claim 15, the utility further comprising code that:

in response to receiving an incoming call, determines a mood, gender, age, and urgency of the caller that placed the incoming call, wherein one or more biometric characteristics are utilized to determine the mood, gender, age, and urgency of the caller;

generates a database of the one or more biometric characteristics assigned to one or more of the mood, the gender, the age, and the urgency of the caller;

analyzes the one or more biometric characteristics received from the caller;

receives a result of the analysis, wherein the result depicts one or more of: the mood, the gender, the age, and the urgency of the caller;

generates an error analysis of the analyzed results, wherein the error analysis depicts a measure of confidence in the result of the analysis;

associates the error analysis with one or more of the mood, the gender, the age, and the urgency of the caller; and outputs the error analysis when a display of one or more of the mood, the gender, the age, and the urgency of the caller is generated.

17. The computer system of claim 16, the utility further comprising code that:

detects the incoming call from the second telecommunication device, wherein the incoming call is associated with the encoded datagram;

receives the encoded datagram;

in response to the encoded datagram being a compressed encoded datagram, decompresses the encoded datagram;

decodes the encoded datagram to extract one or more biometric characteristics;

in response to a number of bits of the encoded datagram exceeding a predefined transmission bandwidth, enables data compression of the encoded datagram;

associates the encoded datagram with the outgoing call;

transmits the encoded datagram to the second telecommunication device;

determines when the encoded datagram is received by the second telecommunication device;

in response to the second telecommunication device not receiving the encoded datagram, automatically invokes an automated interactive voice response to receive the outgoing call at the second telecommunication device, wherein the automated interactive voice response enables one or more biometric voice samples to be detected;

detects one or more biometric voice samples when the automated interactive voice response is invoked;

in response to detecting the one or more biometric voice samples, receives the one or more biometric voice samples; and extracts the one or more biometric characteristics from the one or more biometric voice samples.

18. The computer system of claim 16, the utility further comprising code that:

assigns one or more biometric characteristics to a database containing: one or more voices depicting one or more moods, one or more voices of one or more genders, one or more voices of one or more ages, and one or more voices depicting one or more levels of importance; and dynamically searches the database to determine one or more of the mood, the gender, the age, and the urgency of the caller associated with one or more biometric characteristics of the biometric voice samples, wherein the one or more biometric characteristics are retrieved from the one or more biometric voice samples received with the incoming call.

* * * * *